(12) United States Patent
Rogers et al.

(10) Patent No.: US 7,436,207 B2
(45) Date of Patent: Oct. 14, 2008

(54) INTEGRATED CIRCUIT DEVICE HAVING AT LEAST ONE OF A PLURALITY OF BOND PADS WITH A SELECTABLE PLURALITY OF INPUT-OUTPUT FUNCTIONALITIES

(75) Inventors: J. Clark Rogers, Phoenix, AZ (US); Bryan Kris, Phoenix, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 6 days.

(21) Appl. No.: 11/670,771

(22) Filed: Feb. 2, 2007

(65) Prior Publication Data

US 2008/0018515 A1 Jan. 24, 2008

Related U.S. Application Data

(60) Provisional application No. 60/807,968, filed on Jul. 21, 2006.

(51) Int. Cl.
*G06F 7/38* (2006.01)

(52) U.S. Cl. .............. 326/37; 326/38; 326/39; 326/41; 326/56; 341/126; 341/141

(58) Field of Classification Search .......... 326/37–41, 326/56; 341/126, 141
See application file for complete search history.

(56) References Cited

U.S. PATENT DOCUMENTS

| | | | | |
|---|---|---|---|---|
| 5,686,844 A | * | 11/1997 | Hull et al. ................. | 326/38 |
| 5,724,009 A | * | 3/1998 | Collins et al. ............ | 331/108 C |
| 6,057,705 A | * | 5/2000 | Wojewoda et al. ......... | 326/38 |
| 6,509,758 B2 | * | 1/2003 | Piasecki et al. ........... | 326/37 |
| 6,577,157 B1 | * | 6/2003 | Cheung et al. ............ | 326/38 |
| 6,738,858 B1 | | 5/2004 | Fernald et al. ............ | 710/317 |
| 6,768,617 B2 | * | 7/2004 | Marr ....................... | 361/56 |
| 6,981,090 B1 | | 12/2005 | Kutz et al. ................ | 710/317 |
| 7,190,190 B1 | * | 3/2007 | Camarota et al. .......... | 326/38 |
| 7,285,980 B2 | * | 10/2007 | Bansal et al. ............. | 326/38 |
| 7,366,577 B2 | * | 4/2008 | DiSanza et al. ........... | 700/94 |
| 7,369,078 B2 | * | 5/2008 | Nickel et al. ............. | 341/155 |
| 2002/0153923 A1 | * | 10/2002 | Piasecki et al. ........... | 326/57 |
| 2004/0036500 A1 | * | 2/2004 | Bratt ....................... | 326/39 |
| 2004/0095118 A1 | | 5/2004 | Kernahan ................. | 323/282 |

* cited by examiner

*Primary Examiner*—Khai M Nguyen
(74) *Attorney, Agent, or Firm*—Baker Botts L.L.P.

(57) ABSTRACT

An integrated circuit device having at least one bond pad is coupled to a selectable plurality of input-output functionalities, e.g., an oscillator input, an analog input, an analog output, a digital input and a digital output. These analog, digital and oscillator functionalities may selectably share the same integrated circuit package external connection.

15 Claims, 2 Drawing Sheets

INTEGRATED CIRCUIT DEVICE HAVING AT LEAST ONE OF A PLURALITY OF BOND PADS WITH A SELECTABLE PLURALITY OF INPUT-OUTPUT FUNCTIONALITIES

RELATED PATENT APPLICATION

This application claims priority to commonly owned U.S. Provisional Patent Application Ser. No. 60/807,968; filed Jul. 21, 2006; entitled "Input-Output Pads With Both Analog-Input and Crystal Oscillator Interface Capabilities" by J. Clark Rogers and Bryan Kris, and is hereby incorporated by reference herein for all purposes.

TECHNICAL FIELD

The present disclosure relates to semiconductor integrated circuits having multipurpose input-output pads, and more specifically, to semiconductor integrated circuits having multipurpose input-output pads with analog-input and crystal oscillator interface compatibilities.

BACKGROUND

Multi-function pads on an integrated circuit device allow the use of fewer integrated circuit package external connections, e.g., pins, surface mount connections, balls, etc., for flexible utilization of the integrated circuit in an electronic system. Low pin count integrated circuit packages may be used to save cost and printed circuit board space, and to offer many more user selectable functionality. Current technology integrated circuit multi-function pads share selectable analog and digital functionality, or selectable digital and oscillator functionality, but not all of these functions are selectable to the same integrated circuit multi-function pad.

SUMMARY

What is desired is to recover integrated circuit package external connections typically used for oscillator and/or digital input-output (I/O) functionality also for selectable use as analog inputs, e.g., analog-to-digital converter (ADC) inputs, and analog outputs, e.g., digital-to-analog converter (DAC) output. Thus, analog, digital and oscillator functionalities may selectably share the same integrated circuit package external connection(s). Small pin count integrated circuit packages can maximize pin (external connection) functionality through the use of multi-function integrated circuit pads connected to the integrated circuit package external connections.

According to a specific example embodiment of this disclosure, an integrated circuit device having at least one bond pad with a selectable plurality of input-output functionalities coupled thereto may comprise: at least one bond pad; a digital buffer having an enable input and an output coupled to the at least one bond pad; a digital receiver having an input coupled to the at least one bond pad; an oscillator having an input coupled to the at least one bond pad; an analog-to-digital circuit having an analog input; and a first analog switch coupled between the analog input of the analog-to-digital circuit and the at least one bond pad; wherein the enable input of the digital buffer enables and disables the output thereof, and the first analog switch couples and decouples the analog input of the analog-to-digital circuit to and from the at least one bond pad, respectively.

According to another specific example embodiment of this disclosure, an integrated circuit device having a plurality of bond pads with a selectable plurality of input-output functionalities coupled thereto may comprise: a plurality of bond pads; a plurality of digital buffers, each of the plurality of digital buffers having an enable input and an output coupled to a respective one of the plurality of bond pads; a plurality of digital receivers, each of the plurality of digital receivers having an input coupled to the respective one of the plurality of bond pads; a plurality of oscillators, each of the plurality of oscillators having an input coupled to the respective one of the plurality of bond pads; a plurality of analog-to-digital circuits; and a plurality of first analog switches, each of the plurality of first analog switches coupled between the analog input of a respective one of the plurality of analog-to-digital circuits and the respective one of the plurality of bond pads; wherein the enable input of each of the plurality of digital buffers enables and disables the output thereof, and the plurality of first analog switches couple and decouple the analog inputs of respective ones of the plurality of analog-to-digital circuits to and from the respective ones of the plurality of bond pads.

BRIEF DESCRIPTION OF THE DRAWINGS

A more complete understanding of the present disclosure thereof may be acquired by referring to the following description taken in conjunction with the accompanying drawings wherein.

Figure 1:
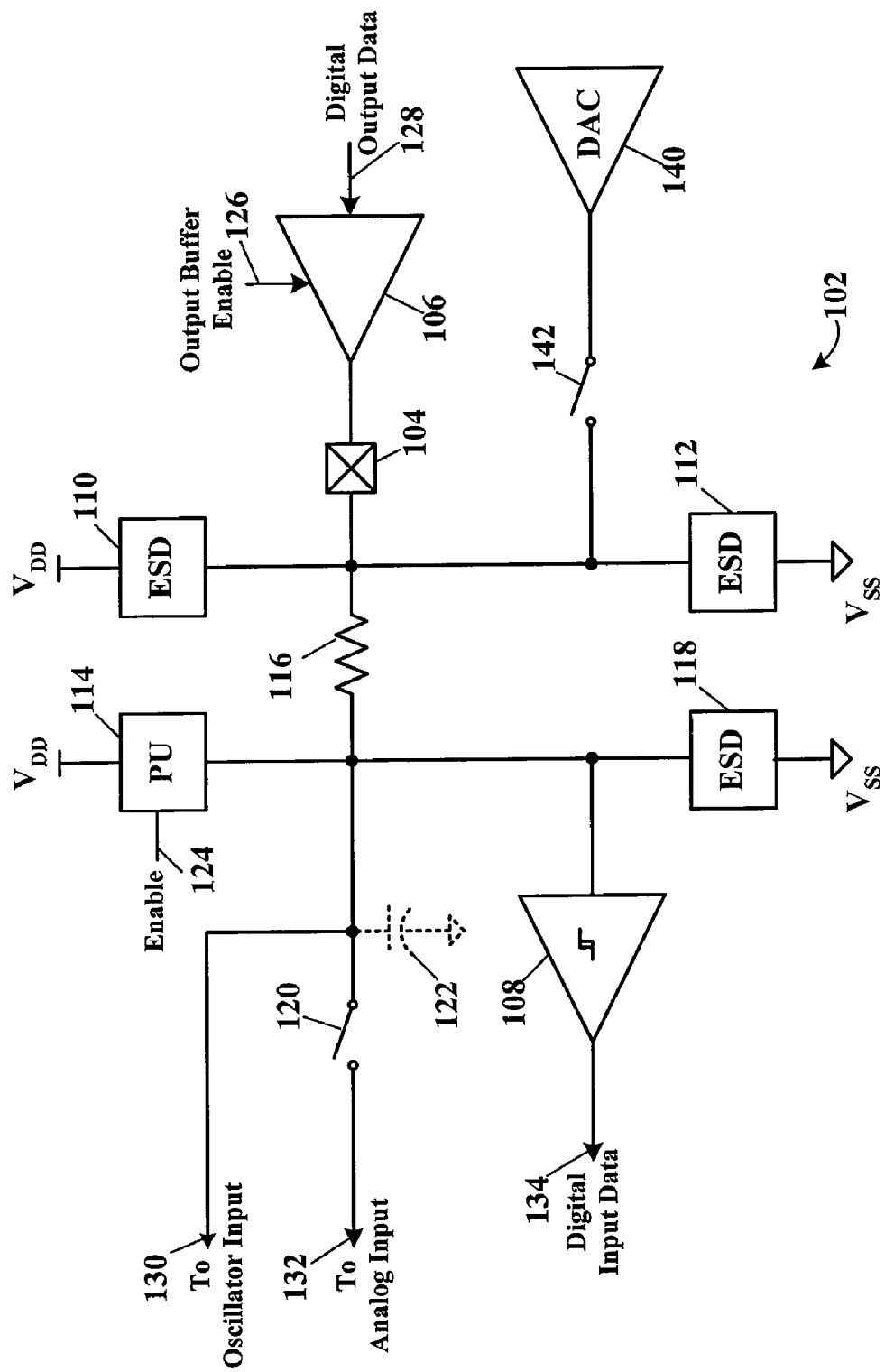
FIG. 1 illustrates a schematic partial circuit diagram of an integrated circuit device having at least one bond pad with a selectable plurality of input-output functionalities, according to a specific example embodiment of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

Referring now to the drawings, the details of specific example embodiments are schematically illustrated. Like elements in the drawings will be represented by like numbers, and similar elements will be represented by like numbers with a different lower case letter suffix.

Figure 2:
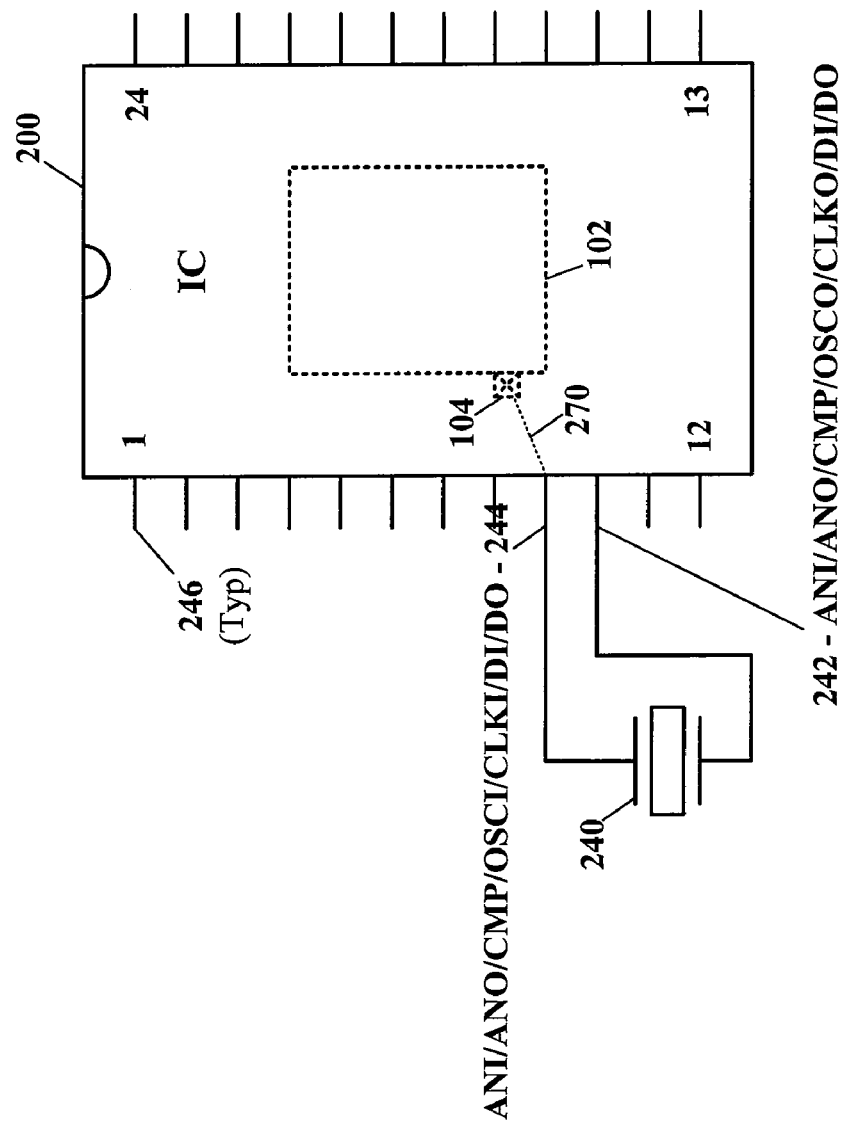
FIG. 2 illustrates a schematic plan view of an integrated circuit device having the bond pad shown in FIG. 1, enclosed in an integrated circuit package and the integrated circuit package being coupled to a frequency determining crystal for an oscillator, according to a specific example embodiment of this disclosure.

Referring to FIG. 1, depicted is a schematic partial circuit diagram of an integrated circuit device having at least one bond pad with a selectable plurality of input-output functionalities, according to a specific example embodiment of this disclosure. An integrated circuit device, generally represented by the numeral 102, may comprise at least one bond pad 104 that may be used to connect to an external connection on an integrated circuit package 200 (FIG. 2). The integrated circuit device 102 may be a microprocessor, a microcontroller, an application specific integrated circuit (ASIC), a digital signal processor (DSP), a programmable logic array (PLA) and the like. The selectable plurality of input-output functionalities may be an oscillator input, an analog input, an analog output, a digital input and a digital output.

A digital output buffer (e.g., driver) 106 may be coupled to the node 104 and controlled with an output buffer enable 126. The digital output buffer 106 when enabled through the output buffer enable 126 will drive the node 104 to logic "1s" and "0s" based upon the digital output data 128. The digital output buffer 106 may also be used as an oscillator output when driving a frequency determining crystal 240 (FIG. 2) or any other type of frequency determining circuit, e.g., resistor-capacitor (RC), inductor-capacitor (LC), piezoelectric resonator, etc. The digital output buffer 106 may be place into a high impedance state when not enabled by the output buffer enable 126. This may effectively decouple the digital output buffer 106 from the node 104 when the node 104 is used for other purposes, e.g., analog input or oscillator input. A pull-up structure 114 may be used when the digital output buffer 106 is configured as an "open collector" (open drain) output. An enable signal line 124 may be used to enable and disable the pull-up structure 114.

An input of a digital receiver 108 may be coupled to the node 104 (optionally through a surge limiting resistor 116) and need not be disabled when another one of the functionalities are being used at the node 104 since the input of the digital receiver 108 may be a high impedance and have a low value of capacitance. The output of the digital receiver 108 may drive a digital input data line 134 that may be coupled to other logic circuits (not shown) internal to the integrated circuit device 102. The digital receiver 108 may be a Schmidt trigger input buffer for digital input data from the node 104. The pull-up structure 114 may also be utilized for maintaining a high "1" logic level (substantially at VDD) when the node 104 is configured as a digital input with the digital receiver 108.

Primary electrostatic discharge (ESD) structures 110 and 112 may be used for suppressing high voltage transients occurring on the node 104 so as to protect the low withstand voltage circuits in the integrated circuit device 102. The surge limiting resistor 116 in combination with a secondary ESD structure 118 may be used for further protection of the more sensitive internal logic, e.g., an analog input 132 and an oscillator input 130 to the respective analog and oscillator circuits (not shown) in the integrated circuit device 102.

An analog switch 120 may couple and decouple the analog input 132 of an analog circuit (not shown), e.g., operational amplifier, comparator, analog-to-digital converter (ADC), etc., to and from the bond pad 104, respectively. The analog switch may add about 1.2 pF of additional load capacitance 122 to the crystal oscillator input 130. However, a typical external load capacitance for a crystal oscillator operating in a high speed (HS) mode may be from about 25 pF to about 35 pF, therefore, the additional analog switch capacitance (about 1.2 pF) load has negligible impact on the crystal oscillator circuit, e.g., 1.2 pF is less than 5 percent tolerance of the external load capacitance of the oscillator. The oscillator input 130 coupled to the node 104 and a digital output coupled to another node (not shown) may be used in an oscillator circuit more fully described hereinbelow.

An analog switch 142 may couple and decouple an analog output of a digital-to-analog converter (DAC) 140, to and from the bond pad 104, respectively. The analog switch 140 may add a negligible amount of additional load capacitance to the bond pad 104.

Referring now to FIG. 2, depicted is a schematic plan view of an integrated circuit device having the bond pad shown in FIG. 1, enclosed in an integrated circuit package and the integrated circuit package being coupled to an frequency determining crystal for an oscillator, according to a specific example embodiment of this disclosure. The integrated circuit device 102 may be enclosed in an integrated circuit package 200. At least one bond pad 104 may be coupled to external package connections 224, 242 and 246, etc., e.g., pin, solder ball, surface mount connection, etc., with a connection 270, e.g., bond wires, inner lead frames, etc. A crystal 240 may be coupled to external package connections 244 and 242 and used in determining an oscillator frequency. The external package connection 244 and/or 242 may be used in any combination selected from the group consisting of an analog input (ANI), an analog output (ANO), an analog comparator input (CMP), an oscillator input (OSCI), an oscillator output (OSCO), a clock input (CLKI), a clock output (CLKO), a digital input (DI) and a digital output (DO). The digital input (DI) and the digital output (DO) may be used concurrently as a digital input-output node. The analog input (ANI) and the analog output (ANO) may be used concurrently as an analog input-output node.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. An integrated circuit device having at least one of a plurality of bond pads with a selectable plurality of input-output functionalities coupled thereto, comprising:
    a plurality of bond pads;
    a digital buffer having an enable input and an output, wherein the output is coupled to a one of the plurality of bond pads;
    a digital receiver having an input coupled to the one of the plurality of bond pads;
    an oscillator having an input coupled to the one of the plurality of bond pads;
    a comparator having first and second analog inputs, wherein the second analog input is coupled to another one of the plurality of bond pads; and
    a first analog switch coupled between the first analog input of the comparator and the one of the plurality of bond pads, wherein the enable input of the digital buffer enables and disables the output thereof, and the first analog switch couples and decouples the first analog input of the comparator to and from the one of the plurality of bond pads, respectively.

2. The integrated circuit device according to claim 1, further comprising:
    a digital-to-analog converter having an analog output; and
    a second analog switch coupled between the analog output of the digital-to-analog converter and the one of the plurality of bond pads, wherein the second analog switch couples and decouples the analog output of the digital-to-analog converter to and from the one of the plurality of bond pads, respectively.

3. The integrated circuit device according to claim 1, further comprising an electrostatic discharge (ESD) protection circuit coupled to the one of the plurality of bond pads.

4. The integrated circuit device according to claim 1, further comprising an active pull-up circuit coupled to the one of the plurality of bond pads, the active pull-up circuit having an enable and disable control input.

5. The integrated circuit device according to claim 1, wherein the integrated circuit device is selected from the group consisting of microprocessor, microcontroller, digital signal processor (DSP), programmable logic array (PLA), and application specific integrated circuit (ASIC).

6. The integrated circuit device according to claim 1, further comprising:
an integrated circuit package enclosing the integrated circuit device; and
an integrated circuit package external connection coupled to the one of the plurality of bond pads.

7. An integrated circuit device having a plurality of bond pads with a selectable plurality of input-output functionalities coupled thereto, comprising:
a plurality of bond pads;
a plurality of digital buffers, each of the plurality of digital buffers having an enable input and an output coupled to a respective one of the plurality of bond pads;
a plurality of digital receivers, each of the plurality of digital receivers having an input coupled to the respective one of the plurality of bond pads;
a plurality of oscillators, each of the plurality of oscillators having an input coupled to the respective one of the plurality of bond pads;
a plurality of analog-to-digital circuits; and
a plurality of first analog switches, each of the plurality of first analog switches coupled between the analog input of a respective one of the plurality of analog-to-digital circuits and the respective one of the plurality of bond pads;
wherein the enable input of each of the plurality of digital buffers enables and disables the output thereof, and the plurality of first analog switches couple and decouple the analog inputs of respective ones of the plurality of analog-to-digital circuits to and from the respective ones of the plurality of bond pads.

8. The integrated circuit device according to claim 7, further comprising:
a plurality of digital-to-analog converters, each of the plurality of digital-to-analog converters having an analog output; and
a plurality of second analog switches, each of the plurality of second analog switches coupled between the analog output of a respective one of the plurality of digital-to-analog converters and the at least one bond pad, wherein the second analog switch couples and decouples the analog output of the digital-to-analog converter to and from the respective one of the plurality of bond pads.

9. The integrated circuit device according to claim 7, wherein the plurality of analog-to-digital circuits are a plurality of analog-to-digital converters.

10. The integrated circuit device according to claim 7, wherein the plurality of analog-to-digital circuits are a plurality of comparators.

11. The integrated circuit device according to claim 10, wherein each of the plurality of comparators has a first analog input coupled a one of the plurality of bond pads and a second analog input coupled to another one of the plurality of bond pads.

12. The integrated circuit device according to claim 7, further comprising an electrostatic discharge (ESD) protection circuit coupled to each of the plurality of bond pads.

13. The integrated circuit device according to claim 7, further comprising an active pull-up circuit coupled to each of the plurality of bond pads, the active pull-up circuit having an enable and disable control input.

14. The integrated circuit device according to claim 7, wherein the integrated circuit device is selected from the group consisting of microprocessor, microcontroller, digital signal processor (DSP), programmable logic array (PLA), and application specific integrated circuit (ASIC).

15. The integrated circuit device according to claim 7, further comprising:
an integrated circuit package enclosing the integrated circuit device; and
a plurality of integrated circuit package external connections, each of the plurality of integrated circuit package external connections coupled to the respective one of the plurality of bond pads.

\* \* \* \* \*